Figure 1:
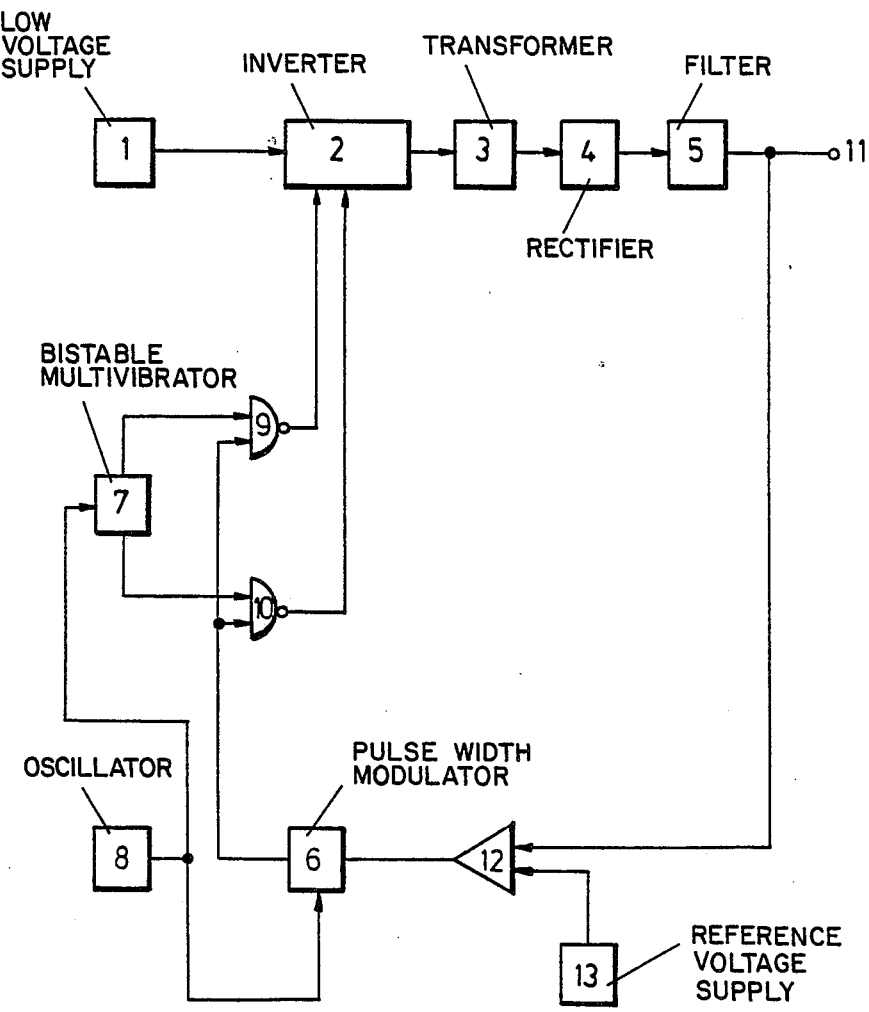

United States Patent [19]

Barna et al.

[11] Patent Number: 4,739,463
[45] Date of Patent: Apr. 19, 1988

[54] HIGH VOLTAGE SOURCE PROVIDING CONTINUOUSLY REGULATED OUTPUT VOLTAGE, PREFERABLY FOR SUPPLYING LOW-POWER ION AND ELECTRON BEAM MACHINING AND EVAPORATING APPARATUSES

[75] Inventors: Árpád Barna; István Bódi, both of Budapest, Hungary

[73] Assignee: MTA Muszaki Fizikai Kutato Intezete, Budapest, Hungary

[21] Appl. No.: 943,382

[22] Filed: Dec. 17, 1986

[30] Foreign Application Priority Data

Dec. 18, 1985 [HU] Hungary .............. 4849/85

[51] Int. Cl.$^4$ .................................. H02M 3/335
[52] U.S. Cl. ......................... 363/26; 363/56; 363/97
[58] Field of Search .................. 363/24–26, 363/41, 56, 97

[56] References Cited

U.S. PATENT DOCUMENTS 4,005,352  1/1977  Kugler et al. ................ 363/26
4,150,424  4/1979  Nuechterlein ............... 363/56 X

FOREIGN PATENT DOCUMENTS 0217968  1/1985  Fed. Rep. of Germany ...... 363/16
0066279  5/1980  Japan ........................ 363/26

Primary Examiner—Peter S. Wong
Attorney, Agent, or Firm—Michael N. Meller

[57] ABSTRACT

The invention relates to a stabilized high voltage source the output voltage of which may be regulated in wide range, whereby the adjusted output current is constant at variable load. The high voltage supply source comprises a high voltage rectifier fed by a push-pull driving circuit, a control circuit supplying push-pull width modulated control signals of the driving circuit and an error signal processing circuit working up the divided voltage and current signals taken from the output of the high voltage source. The output signal of the error signal processing circuit is applied to the control circuit as a control signal. The supply voltage of auxiliary circuits of the supply source is provided by a stabilized low voltage supply unit.

2 Claims, 2 Drawing Sheets

HIGH VOLTAGE SOURCE PROVIDING CONTINUOUSLY REGULATED OUTPUT VOLTAGE, PREFERABLY FOR SUPPLYING LOW-POWER ION AND ELECTRON BEAM MACHINING AND EVAPORATING APPARATUSES

This invention relates to a stabilized high voltage source with an output voltage regulated in a wide range and a constant output current at variable load. The high voltage source comprises a high voltage rectifier fed by a push-pull driving circuit, a control circuit supplying push-pull width modulated control signals of the driving circuit and an error signal processing circuit working up the divided voltage and current signals taken from the output of the high voltage source. The output signal of the error signal processing circuit is applied to the control circuit as a control signal. The supply voltage of auxiliary circuits of the supply source is provided by a stabilized low voltage supply unit.

There are several solutions for forming high voltage supply sources, some of them provide regulated output voltage.

The requirements of variable loads are met more conveniently by pulse width modulated push-pull switching operation supply sources providing a well-regulated output voltage. These supply sources are built generally with low voltage outputs, as is e.g. the supply source of the firm LAMBDA described by Ferenczi, Ö. in (Switching mode supply sources), Chapter 2.2, Műszaki Könyvkiadó, Budapest, 1978.

At this supply source the push-pull inverter is driven with push-pull control signals through two NOR gates which distribute the width modulated signals. The width modulated signal is generated from the signal of a controlled oscillator by a controller comparator. The comparator is controlled by a regulating and current limiting amplifier connected to a DC output of the supply source. Distribution of signals is carried out by a bistable flip-flop driven by the same oscillator.

The width modulated inverter is connected to an output rectifier and filter providing output DC voltage, through a transformer isolation. The layout of the output rectifier may be a range of solutions from the simple one-way rectifier to the voltage multiplying connection. In certain cases when the output transformer has a multiple coil secondary side, the high voltage can be generated by an additive voltage multiplier.

When designating high voltage supply sources, difficulties arise when several contradictory requirements should be met at the same time on the high voltage side. A compromise solution should meet the requirements as follows:
- stabilized high voltage output voltage variable in a wide range;
- constant output current adjustable independently of the output voltage;
- constant current and voltage at variable load;
- endurance of quick short circuits (caused by ion avalanche) without damage;
- minimum ripple.

The known solutions do not comply with the above-described requirements, since the output filter should be eliminated in order to achieve suitable reactions in the case of quick variations which would result in inadmissible ripple and short circuit sensitivity. Keeping the output current and output voltage constant are also contradictory requirements which can be carried out by suitable regulation in the case of suitable output impedance, which, however, requires an output RLC circuit. Using the known regulation circuit does not allow adjustment of the output current independently of the variable but stabilized output voltage since such circuits are operable only when one or other constant is kept about level.

Producing a circuit which complies with the above-described contradictory requirements contradicting to each other is based on the recognition of the following:
- the contradictions with respect to the output filter can be resolved by transforming it to the primary side of the high voltage transformer and carrying it out on that side;
- the transformed filter must be designed to damp the oscillation in the driving circuit so that the high voltage side ripple may be decreased to a minimum;
- a correlation must be ensured between the current and voltage of the high voltage output in an error sensing circuit so that the required constant level value thereof may be adjusted in the circuit;
- the operation frequency of the inverter must be chosen so that it may be the same as the self-frequency of the primary circuit defined by the high voltage transformer.

The present invention accordingly refers to a high voltage source providing continuously regulated output voltage, preferably for supplying low-power ion and electron beam machining and evaporating apparatuses, wherein said high voltage source comprises a control circuit, the control signal input of which is connected to a signal output of an error signal processing circuit, a driving circuit, the control signal inputs of which are connected to push-pull control signal outputs of the control circuit. The driving circuit is coupled with a high voltage rectifier through a high voltage transformer having two push-pull primary windings, one of the high voltage output terminals of said rectifier being coupled through an output voltage-sampling divider, on the one hand, with a high voltage output terminal, and on the other hand, with a voltage signal input of the error signal processing circuit. The other high voltage output terminal of the high voltage rectifier is coupled on the one hand, through a high voltage capacitor with a common ground potential point of the high voltage source, and on the other hand, with a current signal input of the error signal processing circuit. Supply voltage terminals of the circuit arrangement blocks are connected to a low voltage supply source, wherein ground points of said circuit arrangement blocks are connected to a common ground potential terminal.

The main point of the invention is that control inputs of the driving circuits are each connected to control inputs of controlled switches, respectively, the terminals of the controlled switches not connected to the ground potential being coupled with one end of each primary winding of the high voltage transformer, the other end of each primary winding being coupled via primary windings of transformers, respectively, with a supply voltage terminal of the low voltage supply source. One end of each secondary winding of said transformers is commoned and connected to the ground point, each other end being coupled, on the one hand via each diode with the supply voltage terminal, and on the other hand, via each series RC circuit with the ground point.

The high voltage supply source according to the present invention may preferably be designed so that the control circuit comprises a free-running oscillator, a signal shaping unit and a gate control circuit connected in parallel to a signal output of the free-running oscillator, a voltage controlled modulator and two AND gates distributing the output signal, wherein the output of the signal shaping unit is connected to the signal carrier input of the modulator, the control outputs of the gate control circuit being respectively connected to an input of a respective AND gate. The other input of each AND gate is connected to the output of the modulator and the modulating input of the modulator forms a control signal input for the control circuit.

According to a preferred embodiment of the error signal processing circuit of the high voltage source, the current signal input is connected to the ground potential point through a current adjusting potentiometer whose sliding contact is connected to one input of a first error signal amplifier through a current limiting Zener diode. The other input of said error signal amplifier is connected to a reference voltage source, whereby the common point of the Zener diode and the input of the error signal amplifier are connected to the ground point through a resistor. The output of said error signal amplifier is connected also to the ground point through a voltage adjusting potentiometer, the sliding contact of which is connected to one input of a second error signal amplifier, the other input of which forms the voltage signal input of the error signal processing circuit. The output of the second error signal amplifier is the signal output of said error signal processing circuit.

Figure 2:
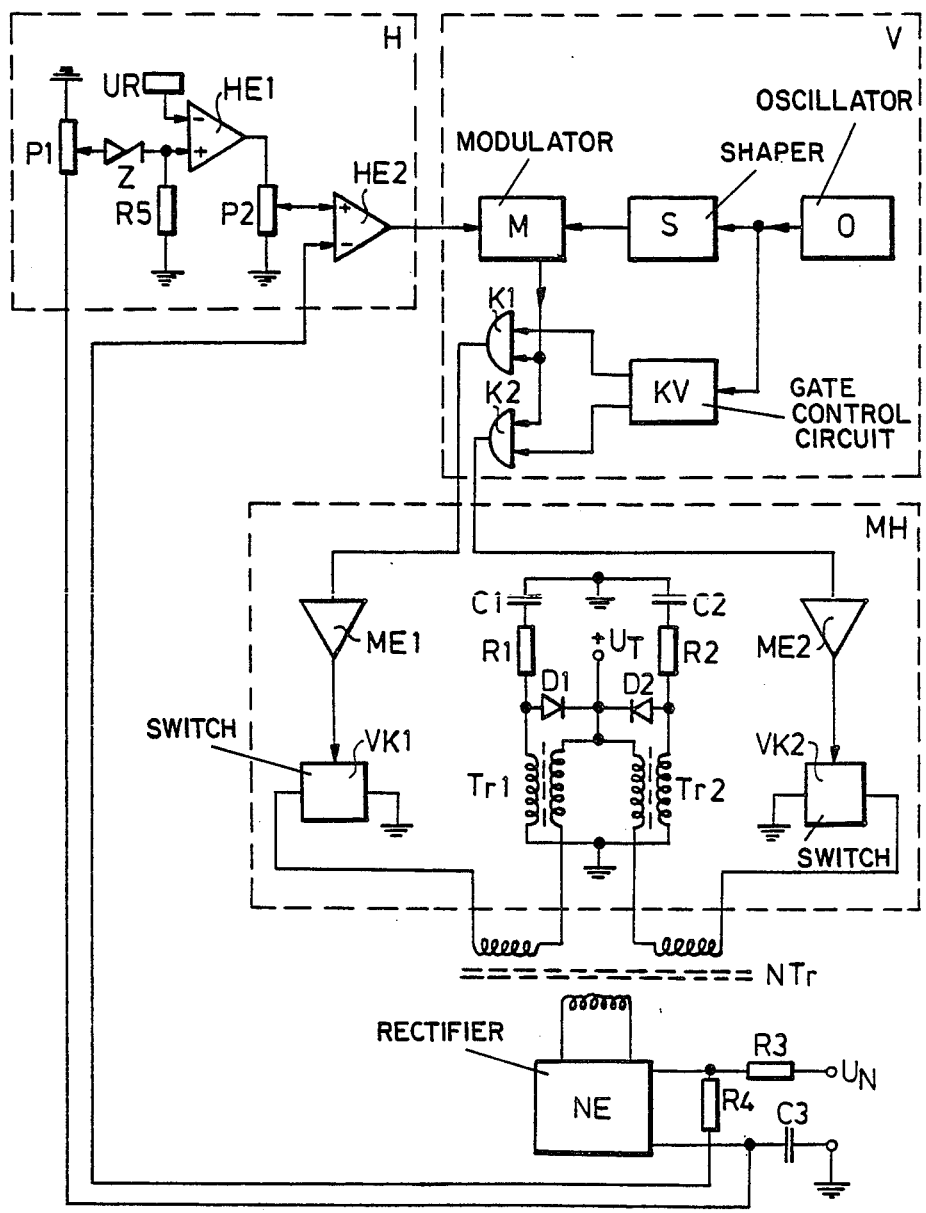

This invention will be further explained with reference to the drawings, wherein:

FIG. 1 shows a block diagram of a known pulse-width modulated push-pull switching operation supply source, FIG. 2 shows a schematic diagram of the supply source according to the invention.

As is shown in FIG. 1, in the known supply source, there is a low-voltage supply circuit 1 which provides supply voltages necessary for the operation of the apparatus (only the high-current supply voltage connection of inverter 2 is indicated in said Figure).

The inverter 2 of the supply source is controlled with push-pull pulse-width modulated signals distributed by NOR gates 9 and 10 driven by bistable multivibrator 7. The pulse-width modulated control signals are generated by a voltage controlled pulse-width modulator 6 from the signal of an oscillator 8. Said signals are specified by the signals taken from the DC output 11 and a reference voltage source 13 and processed with an error amplifier 12. The inverter 2 controlled with the pulse-width modulated push-pull signals feeds a rectifier 4 through a transformer 3 ensuring galvanic isolation and voltage modification. The output signal of the rectifier 4 is applied to the DC output 11 of the supply source through a smoothing and storing LC or LRC filter 5 and results in a smoothed DC current.

The supply source according to the present invention as shown in FIG. 2 has in many respects a similar structure.

Nevertheless, there are basic differences between the the known supply source and the new solution according to the present invention which may be summarized as follows:

the layout of push-pull driving circuit MH fundamentally differs from that of the inverter 2 since the energy storing, the "filtering of output signals" and the damping of harmful oscillations are carried out in this part of the supply source;

the filter 5 is eliminated at the output of high voltage rectifier NE corresponding to rectifier 4;

the layout of error signal processing circuit H basically differs from the unit of the same purpose consisting of the error amplifier 12 and the reference voltage source 13 since the adjustment of the output high voltage is carried out by modifying a correlation between the constant reference signal and the feedback current and voltage signals, respectively, rather than by changing the reference signal.

In the high voltage supply source according to the invention, there is a control circuit V providing push-pull pulse width modulated control signals for the driving circuit MH.

There is a free-running oscillator O in the control circuit V, the output signals of which are applied to the input of a gate control circuit KV and to the carrier signal input of a voltage controlled modulator M via a shaping unit S. The gate control circuit KV drives AND gates K1 and K2, distributing the pulse width modulated control signals. The pulse-width modulated output signals of the modulator M are applied to the other inputs of AND gates K1 and K2. The outputs of AND gates K1 and K2 form the push-pull control signal output of the control circuit V, the control signal input of which is formed by the modulation input of modulator M.

The output of the error signal processing circuit H is connected to the control signal input of the control circuit V. The voltage signal input of the error signal processing circuit H is connected to ground via current adjusting potentiometer P1, and the current signal input thereof is connected to one of the inputs of a second error signal amplifier HE2. The sliding contact of potentiometer P1 is connected to one of the inputs of a first error signal amplifier HE1 via current limiting Zener diode Z, the input of which is connected to ground via resistor R5. A reference voltage source UR is connected to the other input of the first error signal amplifier HE1, the output of which is coupled to ground via voltage adjusting potentiometer P2. The sliding contact of potentiometer P2 is connected to the other input of the second error signal amplifier HE2 and the output of amplifier forms the signal output of the error signal processing circuit H. The width of the square wave signals of the control circuit V is controlled by the voltage applied to the modulator M, and the output current and the output high voltage can be adjusted in unit generating the said voltage by potentiometers P1 and P2, respectively, The Zener diode Z limits the magnitude of the adjustable minimum current. Accordingly, in the output signal of the error signal processing circuit H, there will appear a correlation determined by the potentiometers P1 and P2 and the threshold voltage of the Zener diode Z with respect to the reference voltage. Since the error procesing circuit H is connected to the high voltage output, the error signal arising from a modification of the adjusted values of the output current and voltage by outer influences changes the control signals so that the original state should be re-established with due regard for the lack of an output filter and consequently the inductance thereof, and with regard for the fact that the storing effect of the filter does not prevail and the control circuit operates extremely quickly.

The push-pull control signals are applied to the control inputs of controlled switches VK1 and VK2 through driver amplifiers ME1 and ME2, respectively, in the driving circuit MH. The controlled switches VK1 and VK2 connect each primary winding of a high voltage transformer NTr to the ground potential point depending on the control.

The other end of each primary winding of the high voltage transformer NTr is coupled, through the primary windings of transformer Tr1 and Tr2, respectively with supply voltage terminal $U_t$ of low voltage supply sources of the apparatus. One end of each of the secondary windings of transformers Tr1 and Tr2 is connected to ground, the other end of said secondary winding being connected to supply voltage terminal $U_t$ through diodes D1 and D2, respectively.

The other ends are each connected to ground through series RC circuits consisting respectively of resistor R1, capacitor C1 and resistor R2, capacitor C2.

The push-pull pulse width modulated control signals alternatively bring into operation the VK1 and VK2 controlled switches which alternatively connect one of the primary windings of the high voltage transformer NTr to the supply voltage via the primary winding of either transformer Tr1 or Tr2, respectively. At the instant of switch in, the primary windings of transformers Tr1 and Tr2 prevent the front edge of the pulse from appearing on the primary coil of the high voltage transformer NTr so that a high voltage pulse will not appear across the high voltage winding. The primary winding of the high voltage transformer NTr has a certain capacity in parallel therewith. That capacity starts to charge via the primary coils of the transformers Tr1 and Tr2, respectively. The time of charge and hence the voltage are determined by the width of the controlling square wave signal. A voltage of magnitude determined in this way will appear across the primary windings of high voltage transformer NTr. The magnitude of high voltage across the secondary windings is determined in the same manner with respect to turn ratio.

When controlled switches VK1 and VK2 turn off, the energy stored in the secondary windings of the transformers Tr1 and Tr2 will be fed back to the unregulated supply source via diodes D1 and D2, respectively. High frequency transients and oscillations are damped by series RC circuits connected to the unregulated supply source.

The supply source may operate in the way described above if the frequency of the push-pull control signal equals the parallel self-frequency of the circuit containing the high voltage transformer.

It may be seen that a time-variable change of primary current of the high voltage transformer NTr is determined by the impedances of the circuit and the length of the control signal, so that a saw-tooth voltage arises with an amplitude depending upon the control signal (from zero to the magnitude of the unregulated supply voltage). Accordingly, the circuit arrangement ensures sufficient time for the control system consisting of the error signal processing circuit H and the control circuit V to intervene.

The secondary winding of the high voltage transformer NTr supplies a high voltage rectifier NE of usual layout, e.g. a voltage-doubling rectifier.

One output of the high voltage rectifier is coupled with high voltage terminal UN via a series limiting resistor R3. The voltage signal output of the error signal processing circuit H is connected via a resistor R4 to the same output terminal. Resistors R3 and R4 constitute a voltage sampling divider. The series resistor R3 limits the short circuit current.

The other output of the high voltage rectifier NE is connected the to commoned ground point of the supply source through a capacitor C3. The current signal input of error processing circuit H is connected to the same output.

The high voltage supply with the circuit arrangement according to the invention has the advantageous property that the output current remains constant while the output high voltage is adjusted in a wide range, and this advantage is achieved without changing the dissipated power in the high voltage rectifier or in the driving circuit. At a realized supply source, the efficiency of conversion was about 80% independently of the output power. The magnitude of the output current remains practically constant for a short circuit. Another advantage of the present solution is the small weight and size with respect to output power of the realized apparatus.

We claim:

1. In a high voltage source providing continuously regulated output voltage, preferably for supplying low-power particle beam machining or evaporating apparatus, comprising:

first and second high voltage output terminals across which a high voltage is to be supplied;

first and second low voltage input terminals across which a low voltage is to be supplied;

an error signal processing circuit having an output terminal;

a control circuit having an input terminal connected to said error signal processing circuit;

a driving circuit having first and second control signal input terminals respectively connected to first and second push-pull control signal output terminals of said control circuit;

a high voltage rectifier having first and second output terminals, said first output terminal of said high voltage rectifier being coupled to said first output terminal of said high voltage source and to a voltage signal input terminal of said error processing circuit by way of an output voltage-sampling divider, and said second output terminal of said high voltage rectifier being coupled to said second output terminal of said high voltage source via a capacitor and to a current signal input terminal of said error processing circuit, said driving circuit being coupled to said rectifier via a high-voltage transformer having first and second push-pull primary windings;

the improvement wherein said driving circuit comprises:

first and second driving amplifiers respectively connected to said first and second control signal input terminals;

first and second controlled switches each having a first input terminal connected to a respective one of said driving amplifiers, a second input terminal connected to ground, and an output terminal connected to said high voltage transformer, said first input terminal of said first controlled switch being coupled to an output terminal of said first driving amplifier, said first input terminal of said second controlled switch being coupled to an output terminal of said second driving amplifier, said output terminal of said first controlled switch being coupled to one end of said first push-pull primary winding, and said output terminal of said second controlled switch being coupled to one end of said second push-pull primary winding;

non-linear choke coil means comprising first and second transformers each having a primary winding and a secondary winding, said primary windings of said first, second and high voltage transformers being connected in series, a first junction along the line connecting said primary winding of said first transformer to said primary winding of said second transformer being coupled to said first low-voltage input terminal, and said secondary windings of said first and second windings being connected in series, a second junction along the line connecting said secondary winding of said first transformer to said secondary winding of said second transformer being coupled to ground, the end of said secondary winding of said first transformer not connected to said second junction being coupled to a third junction via a first RC circuit and to said first low voltage input terminal via a first diode, said third junction being connected to ground, and the end of said secondary winding of said second transformer not connected to said second junction being coupled to said third junction via a second RC circuit and to said first low voltage input terminal via a second diode.

2. The high voltage source as defined in claim 1, wherein said error signal processing circuit comprises first and second potentiometers each having a sliding contact, first and second error signal amplifiers each having an output terminal and first and second input terminals, said first input terminal of said second error signal amplifier being connected to said current signal input terminal, said output terminal of said second error signal amplifier being connected to said output terminal of said error signal processing circuit, said second input terminal of said second error signal amplifier being connected to said sliding contact of said second potentiometer, said first potentiometer being connected across said voltage signal input terminal and ground, said second potentiometer being connected across said output terminal of said first error signal amplifier and ground, said first input terminal of said first error signal amplifier being connected to a reference voltage source, said second input terminal of said first error signal amplifier being coupled to said sliding contact of said first potentiometer via a current-limiting Zener diode, a junction on the line connecting said Zener diode and said second input terminal of said first error signal amplifier being coupled to ground via a resistor.

* * * * *